(12) United States Patent
Eichhorn et al.

(10) Patent No.: US 8,596,583 B2
(45) Date of Patent: Dec. 3, 2013

(54) ADJUSTING MECHANISM FOR KINEMATIC GUIDANCE OF AN ADJUSTABLE BODY DURING ITS ADJUSTMENT ON A SUPPORTING STRUCTURAL COMPONENT, ADJUSTING MECHANISM FOR KINEMATIC ADJUSTMENT OF A HIGH LIFT BODY, AND HIGH LIFT SYSTEM COMPRISING A LIKE ADJUSTING MECHANISM

(75) Inventors: Jochen Eichhorn, Neidenfels (DE); Tom Dostmann, Amtsberg-Dittersdorf (DE); Bernhard Schlipf, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 92 days.

(21) Appl. No.: 13/410,381

(22) Filed: Mar. 2, 2012

(65) Prior Publication Data

US 2012/0248257 A1    Oct. 4, 2012

Related U.S. Application Data

(63) Continuation of application No. PCT/EP2010/005436, filed on Sep. 3, 2010.

(60) Provisional application No. 61/239,525, filed on Sep. 3, 2009.

(30) Foreign Application Priority Data

Sep. 3, 2009    (DE) .......................... 10 2009 039 967

(51) Int. Cl.
*B64C 9/08*    (2006.01)

(52) U.S. Cl.
USPC ............................ 244/213; 244/214; 244/215

(58) Field of Classification Search
USPC .................................................. 244/213–217
See application file for complete search history.

(56) References Cited

U.S. PATENT DOCUMENTS 2,608,364 A    8/1952    Gordon et al.

FOREIGN PATENT DOCUMENTS

EP    0 154 047    9/1985

OTHER PUBLICATIONS

International Search Report for Application Serial No. WO 2011/026639 dated Mar. 10, 2011.
International Preliminary Report on Patentability and Written Opinion for Application Serial No. PCT/EP2010/005436 dated Mar. 20, 2012.

*Primary Examiner* — Timothy D Collins
*Assistant Examiner* — Nicholas McFall
(74) *Attorney, Agent, or Firm* — Jenkins, Wilson, Taylor & Hunt, P.A.

(57) ABSTRACT

An mechanism for kinematic guidance of a body during its adjustment on a supporting structure. The body is moved between a refracted position and an extended position while performing a movement in a longitudinal direction in combination with a rotary movement. The mechanism includes first and second transmission levers for coupling to the supporting structure, a base connection lever to which these levers are coupled, third and fourth transmission levers coupled to the base connection lever, an adjusting lever coupled to the third and fourth transmission levers for attachment of the adjustable body, to adjust the body by a movement of the adjusting lever, and a coupling lever coupled to the first or second transmission lever and to the third or fourth transmission lever. During a movement of the adjusting lever, the first and second transmission levers each move opposite to the third and fourth transmission levers.

13 Claims, 3 Drawing Sheets

ADJUSTING MECHANISM FOR KINEMATIC GUIDANCE OF AN ADJUSTABLE BODY DURING ITS ADJUSTMENT ON A SUPPORTING STRUCTURAL COMPONENT, ADJUSTING MECHANISM FOR KINEMATIC ADJUSTMENT OF A HIGH LIFT BODY, AND HIGH LIFT SYSTEM COMPRISING A LIKE ADJUSTING MECHANISM

CROSS-REFERENCE TO RELATED APPLICATIONS

The present application is a continuation of International Application No. PCT/EP2010/005436, filed on Sep. 3, 2010, which claims priority from German Application DE 10 2009 039 967.4, filed on Sep. 3, 2009, and claims the benefit of U.S. Provisional application 61/239,525, filed on Sep. 3, 2009, each of which is hereby incorporated in its entirety by reference.

FIELD OF THE INVENTION

The invention concerns an adjusting mechanism for kinematic guidance of an adjustable body during its adjustment on a supporting structural component, an adjusting mechanism for kinematic adjustment of a high lift body, and a high lift system comprising a like adjusting mechanism.

BACKGROUND

From EP 0154047 A1 an adjusting mechanism for adjusting a trailing edge flap is known which comprises a coupling support which is adapted to be adjusted by a rotary actuator and to which the trailing edge flap is linked. For guidance of the coupling support and thus for guidance of the trailing edge flap, there is linked to the coupling support on the one hand a connecting lever for articulatedly connecting the coupling support to the main wing, and on the other hand a connecting lever for articulatedly connecting the coupling support to the trailing edge flap.

SUMMARY

Various embodiments of the invention provide an adjusting mechanism for kinematic guidance of an adjustable body during its adjustment on a supporting structural component, an adjusting mechanism for kinematic adjustment of a high lift body, and a high lift system comprising a like adjusting mechanism which is of simple construction while requiring comparatively small installation space in the various adjusted conditions, and during an adjustment performs a relatively large translatory movement when a rotary movement of the coupled adjustable body is carried out.

The solution according to various embodiments of the invention in a first aspect also relates to an adjusting mechanism for kinematic guidance of an adjustable body. The adjustable body may in particular be a closure lid such as, e.g., a trunk lid of an automotive vehicle, a (convertible) roof or soft top of an automotive vehicle adapted to be folded back and refracted or some other folding cover where the object in accordance with various embodiments of the invention are to be achieved.

In accordance with this aspect of various embodiments of the invention, an adjusting mechanism for kinematic guidance of an adjustable body during its adjustment on a supporting structural component is provided, wherein the adjustable body may be moved between a retracted position and an extended position while performing a movement in a longitudinal direction in combination with a rotary movement, the adjusting mechanism comprising:

a first transmission lever for coupling to the supporting structural component, and a second transmission lever situated behind the first lever and the adjustable body when viewed in the longitudinal direction for coupling to the supporting structural component, a base connection lever to which the first transmission lever and the second transmission lever are coupled, a third transmission lever coupled to the base connection lever, and a fourth transmission lever situated behind the third lever when viewed in the longitudinal direction and coupled to the base connection lever, an adjusting lever coupled to the third lever and the fourth lever for attachment of the adjustable body, in order to adjust the adjustable body by a movement of the adjusting lever, a coupling lever coupled on the one hand to the first transmission lever or to the second transmission lever and on the other hand to the third transmission lever or to the fourth transmission lever, wherein the connecting locations of the coupling lever and of the base connection lever on the first transmission lever or the second transmission lever are spaced apart from each other, and the connecting locations of the coupling lever and of the base connection lever on the third transmission lever or the fourth transmission lever are spaced apart from each other, whereby the coupling lever couples the rotary movement of the first transmission lever or of the second transmission lever to the rotary movement of the third transmission lever or of the fourth transmission lever.

In accordance with an embodiment of the invention, the orientation of the first, second, third and fourth transmission levers is provided such that during a movement of the adjusting lever, the first and the second transmission levers each move in a sense opposite to the third and fourth transmission levers.

Depending on the application it may be provided that the adjusting lever is part of the adjustable body, i.e., it is rigidly connected to the latter. Here the adjusting lever is a structural component of the adjustable body and may in particular be a supporting structural component of the adjustable body. Alternatively it may be provided that the adjusting lever is linked to the adjustable body.

The solution in accordance with an embodiment of the invention provides an adjusting mechanism for kinematic guidance of an adjustable body during its adjustment on a supporting structural component, whereby a great travelling distance of the adjusting lever or of the respective coupling location of the adjustable body on the adjusting mechanism is obtained at a small installation space of the adjusting mechanism.

When viewed in the longitudinal direction, the third transmission lever may be mounted on the base connection lever behind the second transmission lever or on a same bearing. When viewed in the longitudinal direction, the fourth transmission lever may moreover be mounted on the base connection lever behind the third transmission lever.

Here it may in particular be provided that the second transmission lever and the third transmission lever are mounted on the base connection lever in a same bearing location.

Furthermore it may be provided that when viewed in the longitudinal direction, the third transmission lever is mounted on the base connection lever behind the first transmission lever and in front of the second transmission lever or in front of the first transmission lever. In addition it may be provided that when viewed in the longitudinal direction, the fourth transmission lever is mounted on the base connection lever in front of or behind the second transmission lever.

According to a further aspect of various embodiments of the invention, an adjusting mechanism for an adjustable flap and in particular a high lift system of an aircraft is provided. Here the adjusting mechanism for the kinematic adjustment of a high lift body during the adjustment thereof is provided on a main wing, wherein the high lift body is movable between a retracted and an extended position while performing a movement along a longitudinal direction in combination with a rotary movement. In particular, the adjusting mechanism comprises:

- a first transmission lever for coupling to the main wing, and
- a second transmission lever for coupling to the supporting structural component which is situated behind the first lever and the high lift body when viewed in the longitudinal direction,
- a base connection lever to which the first transmission lever and the second transmission lever are coupled,
- a third transmission lever coupled to the base connection lever and a fourth transmission lever which, when viewed in the longitudinal direction, is situated behind the third lever and is coupled to the base connection lever,
- an adjusting lever coupled to the third lever and the fourth lever for attaching the high lift body in order to adjust the high lift body by a movement of the adjusting lever,
- a coupling lever coupled on the one hand to the first transmission lever or the second transmission lever and on the other hand to the third transmission lever or the fourth transmission lever, wherein the connecting locations of the coupling lever and of the base connection lever on the first transmission lever or the second transmission lever are spaced apart from each other, and the connecting locations of the coupling lever and of the base connection lever on the third transmission lever or the fourth transmission lever are spaced apart from each other, whereby the coupling lever couples the rotary movement of the first transmission lever or of the second transmission lever to the rotary movement of the third transmission lever or of the fourth transmission lever,
- a drive device for actuating the high lift body, comprising a drive lever which is coupled to the high lift body via a spherical bearing, wherein the orientation of the first, second, third and fourth transmission levers is provided such that during a movement of the adjusting lever the first and second transmission levers each move in a sense opposite to the third and fourth transmission levers.

Here it may in particular be provided that the second transmission lever and the third transmission lever are mounted on the base connection lever in a same bearing location. The third transmission lever may generally, when viewed in the longitudinal direction, be mounted on the base connection lever behind the second transmission lever or on a same bearing. Furthermore the fourth transmission lever, when viewed in the longitudinal direction, may be mounted on the base connection lever behind the third transmission lever.

In general it may be provided that the high lift body is a trailing edge flap or a leading edge flap.

The realization of coupling drives (linkages) makes the adjusting mechanism in accordance with various embodiments of the invention particularly well suited for the realization of contour-integrated flap guidance or flap adjustment mechanisms of an aircraft. The overall conditions in the realization of a high lift system of an aircraft are particularly demanding in this case: Due to the demanded long Fowler path of the flap, long coupling members (links) are needed in order to obtain the landing position. The adjusting or guiding mechanism in accordance with an embodiment of the invention solves this set of problems through coupled transmission stages, wherein two four-lever arrangements are coupled to each other. As a result the occurrence of the load multiplication due to a generation of unfavorable angular positions of the components relative to each other is avoided. Moreover it is hereby possible to considerably reduce the loads acting on the slide bearings. At the same time longer Fowler paths are achieved at a comparatively small deflection of component parts.

Due to the solution in accordance with an embodiment of the invention including the dual four-lever arrangement, the adjusting mechanism linkage may be realized in a highly space-saving manner. In aircraft types having rather low high lift performance, Fowler path and flap depth, the solution in accordance with an embodiment of the invention may be employed advantageously. The connection of levers and their coupling may be realized by means of a corresponding slide bearing technology.

Due to the modest space demand, the adjusting mechanism in accordance with an embodiment of the invention may be integrated entirely into the wing contour. Moreover the adjusting mechanism in accordance with an embodiment of the invention may be assembled in an easy manner. It is furthermore advantageous that according to an embodiment of the invention, the single levers are realized as simple components and, e.g., as simple milled parts, so that all in all the adjusting mechanism in accordance with an embodiment of the invention is cost-efficient and may be realized in a simple manner.

In order to allow efficient optimization of the concept, the use of numerical methods is quite expedient. Hereby it is possible to design the adjusting mechanism in accordance with various embodiments of the invention or the coupling drive with a view to a favorable distribution of forces.

The one drive device for actuation of the high lift body may be a rotary actuator which is attached to the main wing and the pivoting lever of which is coupled to the high lift body for actuation of the high lift body. Here the pivoting lever may be coupled to the high lift body via a connecting lever.

According to one practical example of an embodiment of the invention, the third transmission lever, when viewed in the longitudinal direction, is mounted on the base connection lever behind the first transmission lever and in front of the second transmission lever or in front of the first transmission lever. In addition it may be provided that the fourth transmission lever, when viewed in the longitudinal direction, is mounted on the base connection lever in front of or behind the second transmission lever.

According to another aspect of various embodiments of the invention there is provided a high lift system of an aircraft comprising a main wing and a high lift body arranged on the latter by means of an adjusting device so as to be adjustable relative to it, wherein the adjusting device is formed of two adjusting mechanisms in accordance with various embodiments of the invention that are spaced apart from each other in the spanwise direction of the main wing.

According to one practical example of the high lift system it is provided that one of the adjusting mechanisms has the adjusting lever coupled to the high lift body via a spherical rotary joint, and the at least one further adjusting mechanism has the adjusting lever linked to the high lift body via a rotary joint including a fixed axis of rotation. Hereby it is possible to suitably reduce an overdetermination of mounting of the high lift body on the adjusting mechanism with regard to the degrees of freedom of such mounting depending on the application, so that the internal strains occurring in the high lift body due to external forces as a result of its connection may be reduced.

BRIEF DESCRIPTION OF THE DRAWINGS

In the following, example embodiments of the invention will be described by making reference to the appended figures, wherein.

DESCRIPTION

FIGS. 1 to 7 each show practical examples of the adjusting mechanism in accordance with various embodiments of the invention, in the application as an adjusting mechanism for kinematic adjustment of a high lift body K of an aircraft during its adjustment on a supporting structural component of a main wing H of the aircraft. In the figures the structural component is represented in the form of two supports, structural component H1, H2. The high lift body K may in particular be a trailing edge flap or a leading edge flap of the aircraft.

The high lift body K is movable between a retracted position and an extended position while performing a movement along a longitudinal direction L in combination with a rotary movement. As for a description of an adjusting mechanism, reference is made to the main wing coordinate system KS-H drawn, e.g., in FIG. 2 and including a wing-span direction SW-H, a wing depth direction T-H, and a wing thickness direction D-H, as well as to the high lift body coordinate system or flap coordinate system KS-K including a flap-span direction SW-K, a flap depth direction T-K and a flap thickness direction D-K. The longitudinal direction L defined relative to the adjusting mechanism M runs—at least in the retracted condition of the high lift body K where its direction is oriented from the main wing H to the high lift body K—along the wing depth direction T-H and along the flap depth direction T-K.

Figure 1:
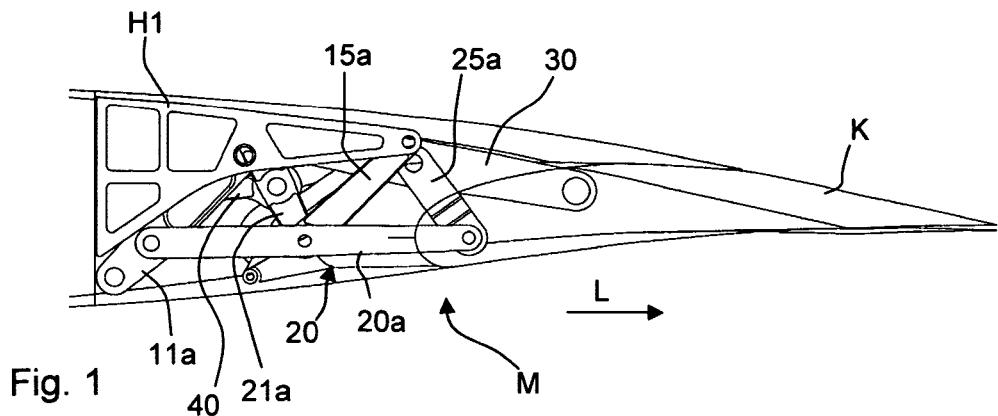
FIG. 1 is a lateral view of a practical example of the high lift system in accordance with an embodiment of the invention with an adjusting mechanism for the adjustment of a trailing edge flap coupled to a structural component of the main wing relative to this structural component in an extended position, wherein the trailing edge flap is drawn in perspective for visualization.
Figure 2:
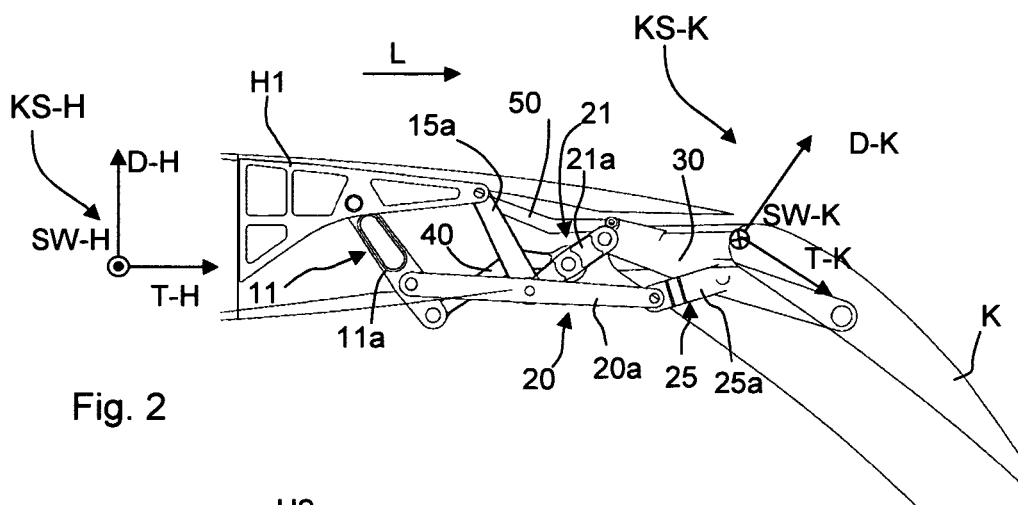
FIG. 2 is a lateral view of the practical example of the high lift system in accordance with an embodiment of the invention represented in FIG. 1 in an extended position.
Figure 3:
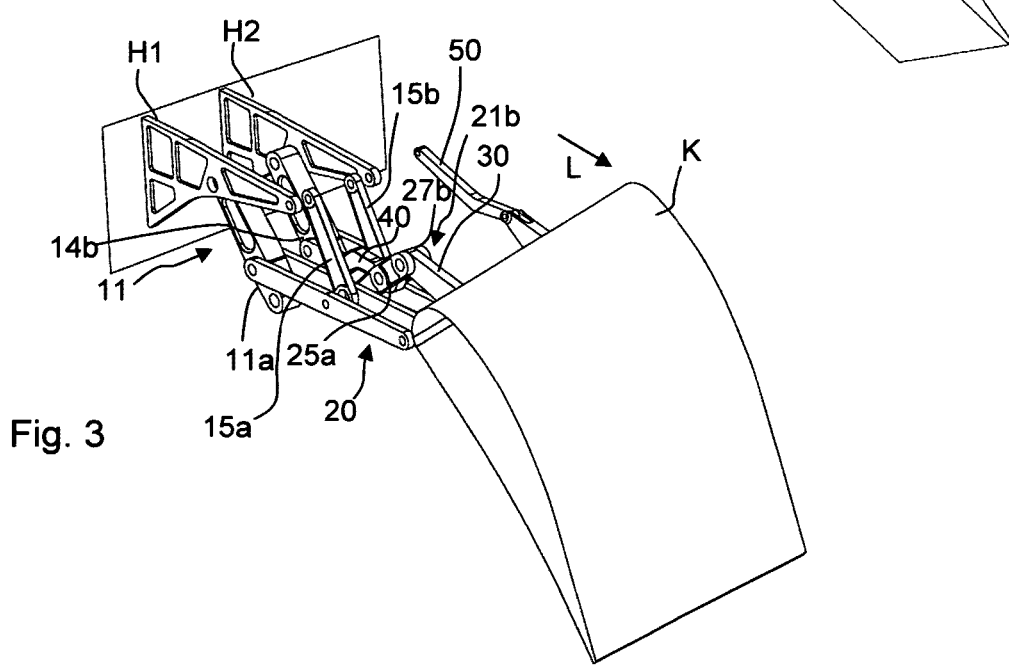
FIG. 3 is a perspective representation of the practical example of the high lift system in accordance with an embodiment of the invention represented in FIG. 1, when viewed obliquely from above and in an extended position.
Figure 4:
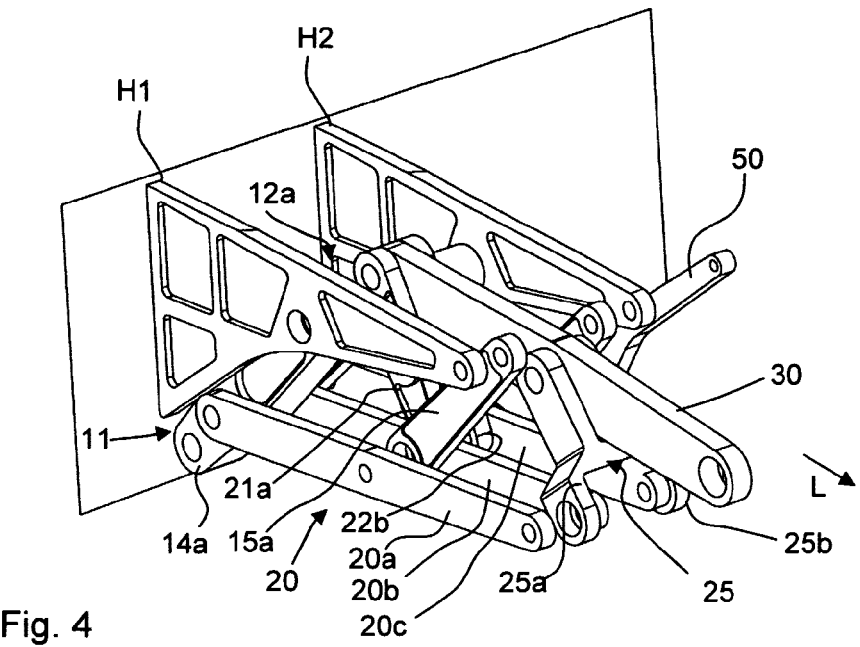
FIG. 4 is a perspective representation of the adjusting mechanism represented in FIGS. 1 to 3 per se, i.e., without a structural component of the main wing and a trailing edge flap, with the adjusting mechanism being shown in the retracted position.
Figure 5:
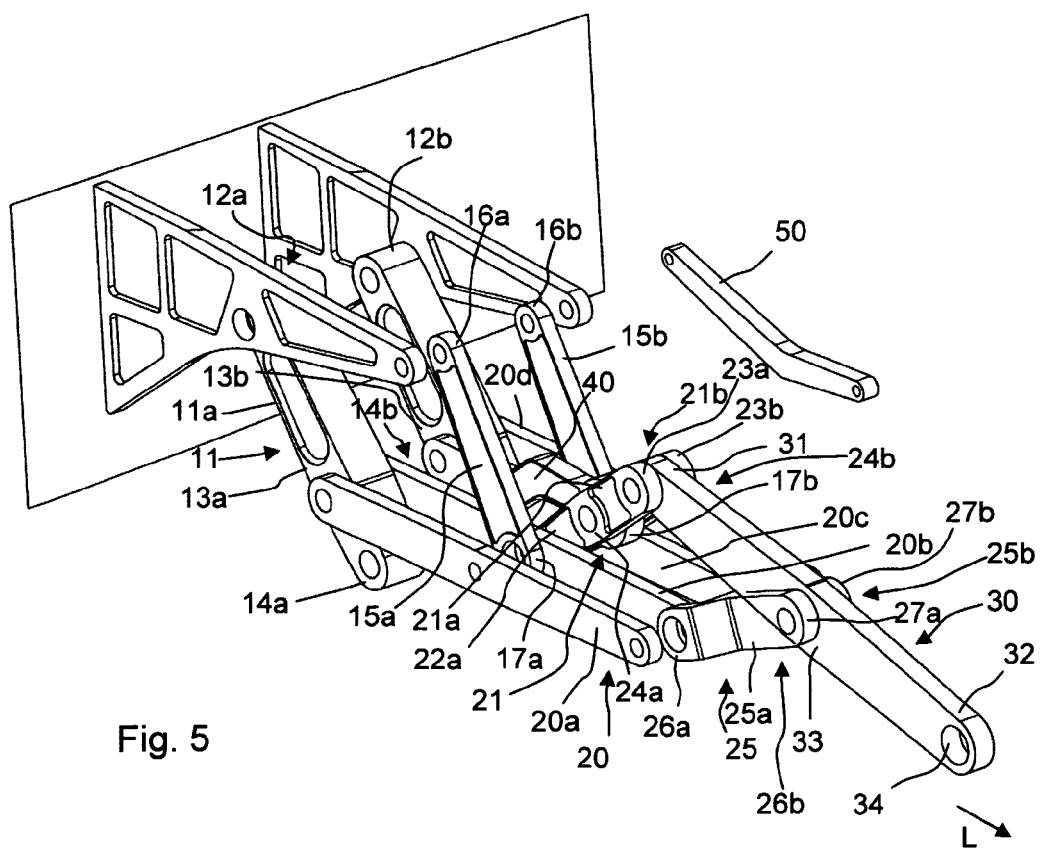
FIG. 5 shows the adjusting mechanism of FIG. 4 per se in a perspective representation, with the adjusting mechanism being shown in the extended position.
Figure 6:
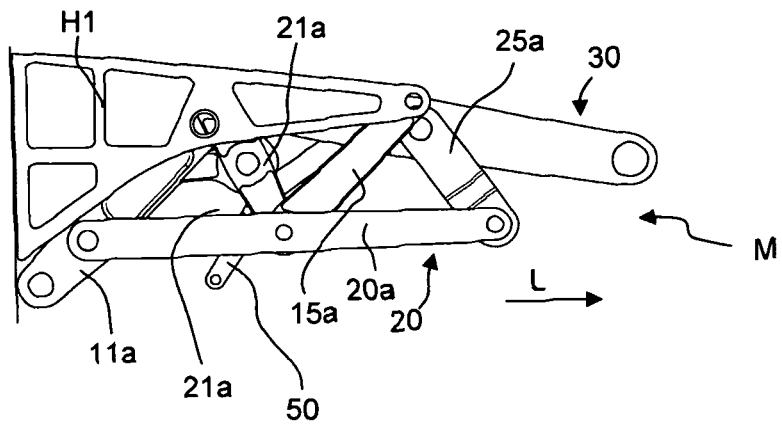
FIG. 6 shows the adjusting mechanism of FIG. 4 per se in a lateral view, with the adjusting mechanism being shown in the refracted position.
Figure 7:
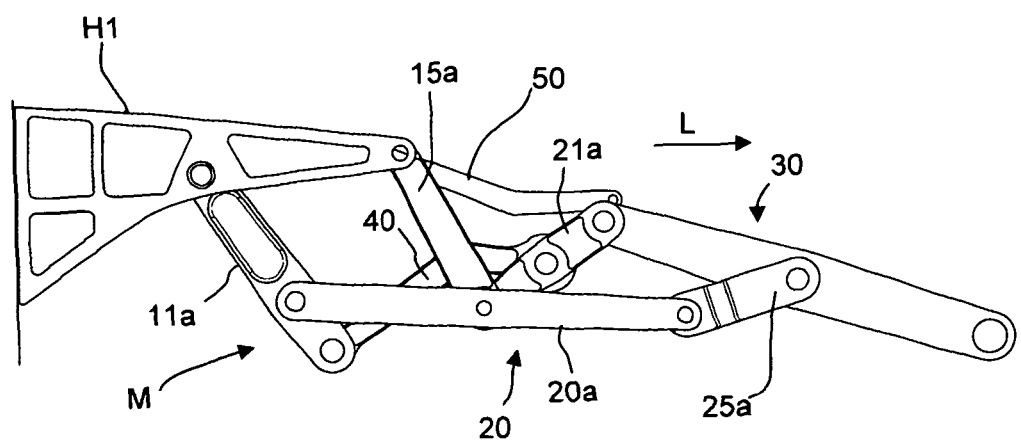
FIG. 7 shows the adjusting mechanism of FIG. 4 per se in a lateral view, with the adjusting mechanism being shown in the extended position.

FIGS. 1, 4 and 6 each show the adjusting mechanism in a condition where the high lift body K is in a retracted position relative to the main wing H, and FIGS. 2, 3, 5 and 7 each show the adjusting mechanism in a condition where the high lift body H1 is in an extended position relative to the main wing H.

The adjusting mechanism M comprises two first transmission levers 11a, 11b which are linked by respective first end portions 12a and 12b to the supporting structural component H1, H2 of a main wing H. Moreover the adjusting mechanism M comprises two second transmission levers 15a, 15b which are linked by respective first ends 16a and 16b to the supporting structural component H1, H2 of a main wing H and which are situated behind the first transmission levers 11a, 11b when viewed in the longitudinal direction L.

The adjusting mechanism M comprises an arrangement of base connection levers 20 to which the first transmission lever 11a, 11b and the second transmission lever 15a, 15b are each coupled by a respective central portion 13a, 13b or a second end portion 17a, 17b. In the practical example represented in the figures, four base connection levers 20 are provided of which two respective base connection levers 20a, 20b and 20c, 20d each are coupled to the first transmission lever 11a, 11b or the second transmission lever 15a, 15b. Two each of the base connection levers 20a, 20b and 20c, 20d are here coupled on opposite sides of the first transmission levers 11a, 11b and of the two second transmission lever 15a, 15b, respectively.

In the represented practical example, the two first transmission levers 11a, 11b and the two second transmission levers 15a, 15b are arranged behind one another and in parallel with each other when viewed in the wing-span direction SW-H. This results in a symmetrical distribution of forces and strains in the single levers and components of the adjusting mechanism M. Number and arrangement of the first transmission levers 11a, 11b and second transmission levers 15a, 15b depends on the respective application. In an alternative embodiment, the adjusting mechanism M may also be formed with only one respective first transmission lever 11a, 11b, and the two second transmission levers 15a, 15b correspondingly with only one base connection lever 20.

Two third transmission levers 21a, 21b and two fourth transmission levers 25a, 25b are coupled to the base connection lever 20. In the represented practical example, the third transmission levers 21a, 21b and the fourth transmission lever 15a, 15b are coupled to two respective base connection levers 20a, 20b and 20c, 20d by a respective first end portion 22a or 22b and by a respective first end portion 22a or 22b. In the represented practical example, the third transmission levers 21a, 21b are coupled to the two inner base connection levers 20a, 20b on respective inner sides of the latter facing each other. Moreover, in the represented practical example one respective fourth transmission lever 25a, 25b is situated between two respective base connection levers 20a, 20b and 20c, 20d.

In particular it may be provided that the second transmission lever and the third transmission lever are mounted on the base connection lever in a same bearing location, as is shown in the figures.

The third transmission levers 21a, 21b and the fourth transmission levers 25a, 25b are each coupled to an adjusting lever 30 by a second end portion 23a or 23b and a second end portion 27a or 27b, respectively. The adjusting lever 30 is situated between the two third transmission levers 21a, 21b and the two fourth transmission levers 25a, 25b. The adjusting lever 40 is provided such that it adjusts the high lift body K by its adjusting movement.

In the shown practical example comprising two third transmission levers 21a, 21b and two fourth transmission levers 25a, 25b each, the adjusting lever 30 is situated between the latter, so that these transmission levers are coupled to the adjusting lever 30 on the respective opposite outer sides of the latter.

The second end portions 23a and 23b of the third transmission levers 21a, 21b may be coupled to the adjusting lever 30 on a first end 31 of the latter. Moreover the second end portions 27a and 27b of the fourth transmission levers 25a, 25b may be coupled to the adjusting lever 30 at a central portion 33 thereof.

In the practical examples of various embodiments of the invention represented in the figures, the at least one third transmission lever 21a, 21b is situated behind the at least one first transmission lever when viewed in the longitudinal direction L, and the at least one fourth transmission lever 25a, 25b is situated behind the at least one second transmission lever when viewed in the longitudinal direction L. In addition it may be provided that at least one third transmission lever 21a, 21b is also situated behind the at least one second transmission lever 22a, 22b when viewed in the longitudinal direction L.

In accordance with an embodiment of the invention, the adjusting mechanism M comprises a coupling lever 40 to which the at least one first transmission lever 11a, 11b is coupled by a second end portion 14a, 14b situated opposite to the first end portion, and the at least one third transmission lever 21a, 21b by a central portion 24a or 24b. The connecting locations of the coupling lever 40 and of the base connection lever 20 on the first transmission lever 11a, 11b are spaced apart from each other when viewed in the longitudinal direction of the latter. Furthermore, the connecting locations of the coupling lever 40 and of the base connection lever 20 on the third transmission lever 21a, 21b are spaced apart from each other, to thus provide coercive coupling of the rotary movements of the respective transmission levers through the coupling lever 40 and the base connection lever 20.

The transmission levers or further levers, if realized as multiples, may also have the form of components fixed to each other or integral components, as is illustrated by the fourth transmission lever 25 of FIG. 4.

In accordance with an embodiment of the invention, the arrangement or orientation of the respective at least one first, second, third and fourth transmission lever is provided such that during a movement of the adjusting lever 30, the first and the second transmission lever move in a respective sense opposite to the third and the fourth transmission lever.

For the adjustment or actuation of the adjusting mechanism M, a drive device moving the adjustable body or the high lift body K is provided. The drive device may be realized and arranged such that it moves one of the transmission levers or one of the further levers 20, 30, 40 in order to bring about an adjusting movement of the adjustable body or of the high lift body K.

The drive device for actuation of the high lift body may in particular be a rotary actuator driven, e.g., by a drive motor arranged in the fuselage of the aircraft, which is attached to the main wing and the pivoting lever of which is coupled to the high lift body for actuation of the high lift body. The pivoting lever may also be coupled to the high lift body via a connecting lever.

In the high lift system of an aircraft provided in accordance with another aspect of various embodiments of the invention, the adjusting device is formed of two adjusting mechanisms M in accordance with an embodiment of the invention which are spaced apart from each other in the spanwise direction of the main wing. Here it is only necessary for one drive device per adjusting device to be provided.

In particular it may be provided that the joint 34 for coupling the adjusting lever 30 to the adjustable body K is formed at the second end 32 of the adjusting lever 30 as a spherical joint. This serves to avoid distortions or internal coercive forces if at least two adjusting mechanisms M are coupled to a same adjustable body K by a respective adjusting lever 30.

In accordance with an embodiment of the invention there is furthermore provided a dual four-lever arrangement, i.e., a series of two arrangements each consisting of four parts that may be adjusted relative to each other. The first arrangement is formed of the supporting structural component H1, H2, the first transmission lever 11, the base connection lever 20, and the second transmission lever 15, and the second arrangement is formed of the base connection lever 20, the third transmission lever 21, the adjusting lever 30, and the fourth transmission lever 25.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An adjusting mechanism for kinematic guidance of an adjustable body during its adjustment on a supporting structural component of an aircraft, wherein the adjustable body may be moved between a retracted position and an extended position while performing a movement in a longitudinal direction in combination with a rotary movement, the adjusting mechanism comprising:
   a first transmission lever coupled to the supporting structural component, and a second transmission lever situated behind the first transmission lever when viewed in the longitudinal direction, the second transmission lever coupled to the supporting structural component,
   a base connection lever to which the first transmission lever and the second transmission lever are directly coupled,
   a third transmission lever directly coupled to the base connection lever, and a fourth transmission lever situated behind the third lever when viewed in the longitudinal direction and directly coupled to the base connection lever,
   an adjusting lever coupled to the third transmission lever and the fourth transmission lever, comprising a point of attachment of the adjustable body, in order to adjust the adjustable body by a movement of the adjusting lever,
   a coupling lever coupled to the first transmission lever and to the third transmission lever, or to the second transmission lever and the fourth transmission lever, wherein the connecting locations of the coupling lever and of the base connection lever on the first transmission lever or the second transmission lever are spaced apart from each other, and the connecting locations of the coupling lever and of the base connection lever on the third transmission lever or the fourth transmission lever are spaced apart from each other,
   wherein the orientation of the first, second, third and fourth transmission levers is provided such that during a movement of the adjusting lever, the first and second transmission levers each move in a direction substantially opposite to the third and fourth transmission levers.

2. The adjusting mechanism according to claim 1, wherein when viewed in the longitudinal direction, the third transmission lever is mounted on the base connection lever behind the second transmission lever or on a same bearing, and when viewed in the longitudinal direction, the fourth transmission lever is mounted on the base connection lever behind the third transmission lever.

3. The adjusting mechanism according to claim 1, wherein the adjusting lever is part of the adjustable body.

4. The adjusting mechanism according to claim 1, wherein the adjusting lever is linked to the adjustable body.

5. An adjusting mechanism for kinematic adjustment of a high lift body during its adjustment on a main wing, wherein the high lift body is movable between a retracted and an extended position while performing a movement along a longitudinal direction in combination with a rotary movement, the adjusting mechanism comprising:
 a first transmission lever coupled to the main wing, and a second transmission lever coupled to the supporting structural component, wherein the second transmission lever is situated behind the first transmission lever when viewed in the longitudinal direction,
 a base connection lever to which the first transmission lever and the second transmission lever are directly coupled,
 a third transmission lever directly coupled to the base connection lever and a fourth transmission lever which, when viewed in the longitudinal direction, is situated behind the third transmission lever and is directly coupled to the base connection lever,
 an adjusting lever coupled to the third transmission lever and the fourth transmission lever, which is coupled to the high lift body in order to adjust the high lift body by a movement of the adjusting lever,
 a coupling lever coupled to the first transmission lever and to the third transmission lever, or to the second transmission lever and the fourth transmission lever, wherein the connecting locations of the coupling lever and of the base connection lever on the first transmission lever or the second transmission lever are spaced apart from each other, and the connecting locations of the coupling lever and of the base connection lever on the third transmission lever or the fourth transmission lever are spaced apart from each other,
 a drive device for actuating the high lift body, comprising a drive lever which is coupled to the high lift body via a spherical bearing,
wherein the orientation of the first, second, third and fourth transmission levers is provided such that during a movement of the adjusting lever the first transmission lever and the second transmission lever each move in a direction substantially opposite to the third transmission lever and fourth transmission lever.

6. The adjusting mechanism according to claim 5, wherein the second transmission lever and the third transmission lever are mounted on the base connection lever in a same bearing location.

7. The adjusting mechanism according to claim 5, wherein the high lift body is a trailing edge flap.

8. The adjusting mechanism according to claim 5, wherein the high lift body is a leading edge flap.

9. The adjusting mechanism according to claim 5, wherein the drive device for actuation of the high lift body is a rotary actuator which is attached to the main wing and the pivoting lever of which is coupled to the high lift body for actuation of the high lift body.

10. The adjusting mechanism according to claim 9, wherein the pivoting lever is coupled to the high lift body via a connecting lever.

11. The adjusting mechanism according to claim 5, wherein the third transmission lever, when viewed in the longitudinal direction, is situated behind the first transmission lever, and the fourth transmission lever, when viewed in the longitudinal direction, is situated behind the second transmission lever.

12. A high lift system of an aircraft comprising a main wing and a high lift body arranged on the latter by an adjusting device so as to be adjustable relative to it, wherein the adjusting device is formed of two adjusting mechanisms according to claim 5 that are spaced apart from each other in the spanwise direction of the main wing.

13. The high lift system according to claim 12, wherein one of the adjusting mechanisms has the adjusting lever coupled to the high lift body via a spherical rotary joint, and the at least one further adjusting mechanism has the adjusting lever linked to the high lift body via a rotary joint including a fixed axis of rotation.

\* \* \* \* \*